G. R. Hughes,
Washing Machine.

Nº 64,876.  Patented May 21, 1867.

Witnesses;
Theo Trusch
J. A. Service

Inventor;
Geo. R. Hughes
Per Munn & Co
Attorneys

United States Patent Office.

GEORGE R. HUGHES, OF CENTRALIA, MISSOURI.

Letters Patent No. 64,876, dated May 21, 1867.

---

IMPROVED WASHING MACHINE.

---

The Schedule referred to in these Letters Patent and making part of the same.

---

TO ALL WHOM IT MAY CONCERN:

Be it known that I, GEORGE R. HUGHES, of Centralia, in the county of Boone, and State of Missouri, have invented a new and useful improvement in Washing Machines; and I do hereby declare that the following is a full, clear, and exact description thereof, which will enable others skilled in the art to make and use the same, reference being had to the accompanying drawings, forming part of this specification.

My invention consists in constructing a washing machine somewhat upon the plan of the common pounding-barrel, but still very unlike it, and vastly more efficient in its operation and appointments.

Similar letters of reference indicate like parts.

Figure 1:
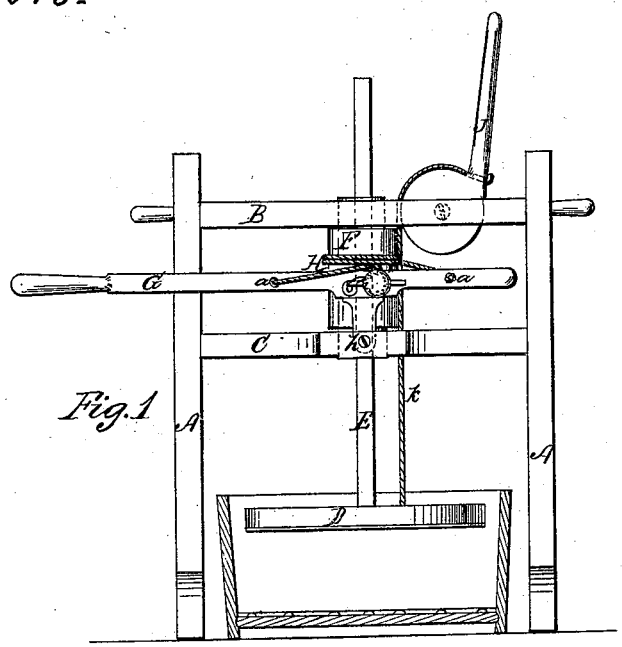
Figure 1 represents a side or front elevation of my machine.
Figure 2:
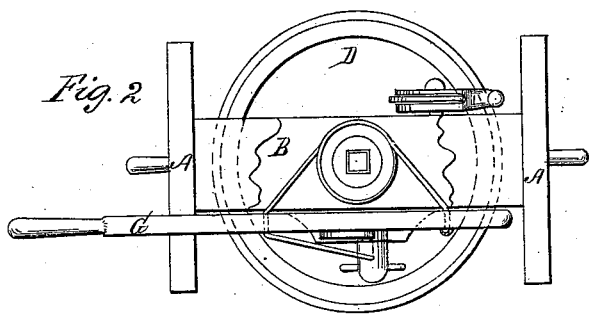
Figure 2 is a top or plan view.
Figure 3:
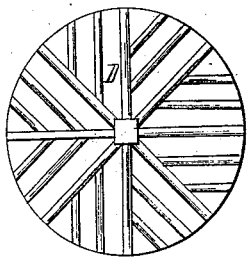
Figure 3 represents the surface which comes in contact with the clothes in the process of washing.

The frame which supports my apparatus is composed of two upright posts or standards and tin cross-ties. A represents the standards. B represents the upper cross-tie, and C the lower cross-tie. D is the disk, the under surface of which is shown in fig. 3. E is a square shaft or rod attached to the disk D. F is a drum or cylinder, standing between the two cross-ties, and through the centre of which the shaft E passes loosely. The ends of this drum have journals which pass through the cross-ties which support it in its revolution or motion. G is a bent or T-lever, attached to the lower cross-tie at the bottom of the T by a pivot, $h$, or joint, so that it can oscillate or swing on the pivot. H is a cord, both ends of which pass through this lever G at $a\ a$, and are attached to a little windlass which revolves in the lever. This windlass has a ratchet upon it, and it is held in position by a pawl, (also attached to the lever,) which drops into the ratchet notches. The use of this windlass is to tighten the cord on the drum F, around which it is passed two or three times, as represented in the drawing. It is fastened to the drum at one point. J is a lever, attached to the opposite side of the upper cross-piece B, its end forming an arc of a circle. This circular portion is grooved for the purpose of guiding a cord, $k$, which is attached to the lever at one end, and to the disk D at the other end. When this lever is raised the disk is raised also, as the cord then rests in the grooved arc on the lever. When the other lever G is raised or lowered from a horizontal position the drum F is revolved. It will be seen, therefore, that the disk has a compound motion, a vertical motion, and a rotating motion, at the same time when the machine is in operation. The lower side of the disk has cross-bars nailed on to it, substantially as represented in the drawing. This disk is lowered into a tub, the bottom of which has bars upon it similar to those on the disk. The tub is represented in the drawing in red lines.

Having thus described my invention, what I claim as new, and desire to secure by Letters Patent, is—

The cylinder or drum F, the bent lever G, the lever J, the ratchet and pawl for tightening the cord on the cylinder or drum F, the shaft E, the cords H and K, and the disk D, constructed, arranged, and operating substantially as described, in combination with the frame A.

GEO. R. HUGHES.

Witnesses:
W. L. CONNEVEY,
FREDERICK SHRYOCK.